United States Patent Office 3,734,919
Patented May 22, 1973

3,734,919
4,5 - DI-HYDROPYRROLO[3,2,1-jk][1,4]BENZODI-
AZEPIN-7(6H)-ONES AND 4,5-DI-HYDROPYR-
ROLO[1,2,3 - ef][1,5]BENZODIAZEPIN - 6(7H)-
ONES
Jackson B. Hester, Jr., Portage, Mich., assignor to The
Upjohn Company, Kalamazoo, Mich.
No Drawing. Original application Nov. 3, 1969, Ser. No.
873,693, now Patent No. 3,642,821. Divided and this
application June 21, 1971, Ser. No. 155,282
Int. Cl. C07d 53/02
U.S. Cl. 260—239.3 T            14 Claims

ABSTRACT OF THE DISCLOSURE 4,5,6,7 - tetrahydropyrrolo[3,2,1 - jk][1,4]benzodiazepines, 4,5,6,7 - tetrahydropyrrolo[1,2,3-ef][1,5]benzodiazepines, 4,5 - dihydropyrrolo[3,2,1-jk][1,4]benzodiazepin - 7(6H) - ones, 4,5-dihydropyrrolo[1,2,3-ef][1,5]benzodiazepin - 6(7H) - ones and processes for preparing the same. Said compounds exhibit tranquilizing and anticonvulsant activity.

BRIEF SUMMARY OF THE INVENTION

This is a division of application Ser. No. 873,693, filed Nov. 3, 1969, now U.S. Pat. No. 3,642,821.

This invention relates to novel 4,5,6,7-tetrahydropyrrolo[3,2,1-jk][1,4]benzo-
diazepines (I),
4,5,6,7-tetrahydropyrrolo[1,2,3-ef][1,5]benzo-
diazepines (II),
4,5-dihydropyrrolo[3,2,1-jk][1,4]benzodiazepin-7(6H)-
ones (III),
4,5-dihydropyrrolo[1,2,3-ef][1,5]benzodiazepin-6(7H)-
ones (IV) and processes for preparing the same.

The novel compounds of this invention have the formulae

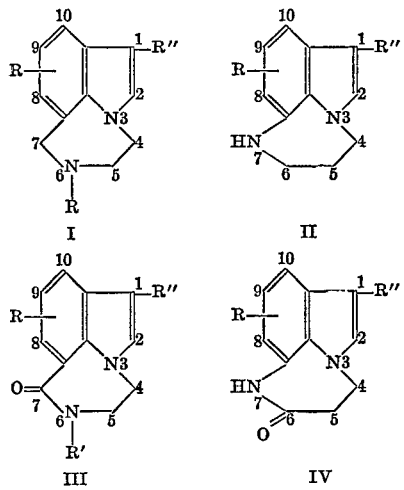

wherein R is selected from the group consisting of hydrogen, alkyl of from 1 to 3 carbon atoms, inclusive, alkoxy of from 1 to 3 carbon atoms, inclusive, and halogen; wherein R' is selected from the group consisting of hydrogen, alkyl of from 1 to 3 carbon atoms, inclusive, 4-oxo-4-(p-fluorophenyl)butyl, and the group

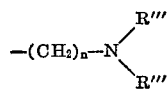

wherein $n$ is an integer of from 2 to 4, inclusive, and R''' is alkyl of from 1 to 3 carbon atoms, inclusive; and wherein R'' is hydrogen or the group

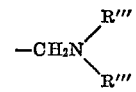

wherein R''' is the same as above.

The term "novel compounds of this invention," as used throughout the specification embraces the compounds represented by Formulae I, II, III and IV above, and the acid addition salts of (a) the compounds represented by Formulae I and II and (b) the compounds represented by Formulae II and IV wherein R' is

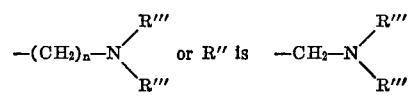

as defined above.

The term halogen is inclusive of chlorine, bromine and fluorine.

The compounds of Formula I, except those compounds of Formula I wherein R' is 4-oxo-4-(p-fluorophenyl)butyl can be prepared by reducing the corresponding compounds of Formula III and the compounds of Formula II can be prepared by reducing the compounds of Formula IV. The reduction processes are illustrated by the following equations.

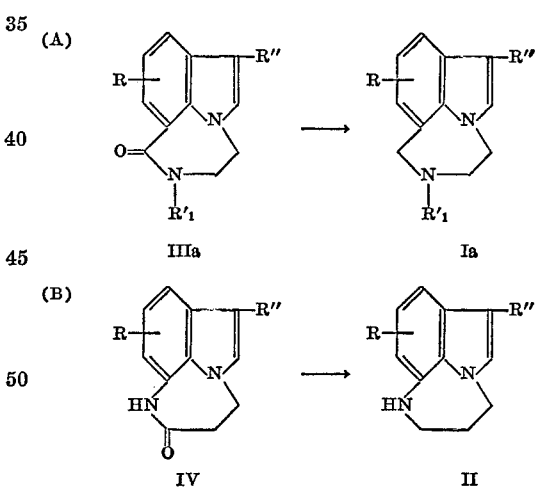

wherein R and R'' are the same as above, and R₁' is selected from the group consisting of hydrogen, alkyl of from 1 to 3 carbon atoms, inclusive, and

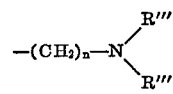

wherein R''' and $n$ are the same as above.

Compounds of Formula I wherein R' is 4-oxo-4-(p-fluorophenyl)butyl can be prepared by a process illustrated by Equation C.

(C) 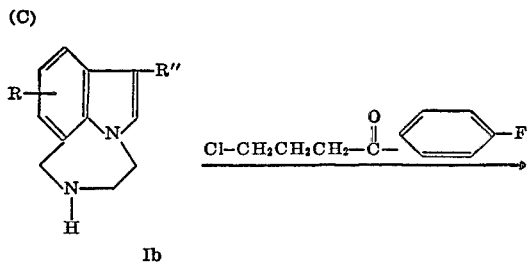

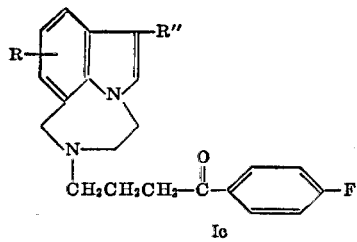

wherein R and R'' are the same as above.

Compounds of Formulae III and IV wherein R'' is hydrogen can be prepared by the processes illustrated by Equations D and E, respectively.

(D)

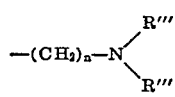

(E)

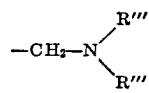

wherein R is the same as above, $R_2'$ is selected from the group consisting of alkyl of from 1 to 3 carbon atoms, inclusive, 4-oxo-4-(p-fluorophenyl)butyl, and the group $$-(CH_2)_n-N\diagdown_{R'''}^{R'''}$$

wherein R''' is the same as above, and X is halogen, preferably chlorine or bromine.

Compounds of Formulae III and IV wherein R'' is $$-CH_2-N\diagdown_{R'''}^{R'''}$$

can be prepared by the processes illustrated by Equations F and G, respectively.

(F) 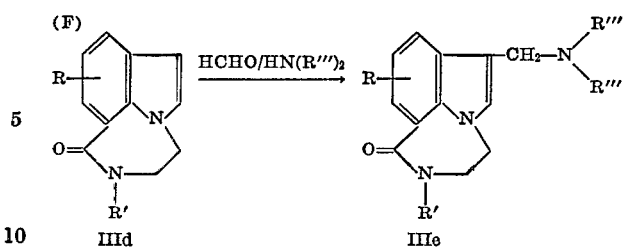

(G) 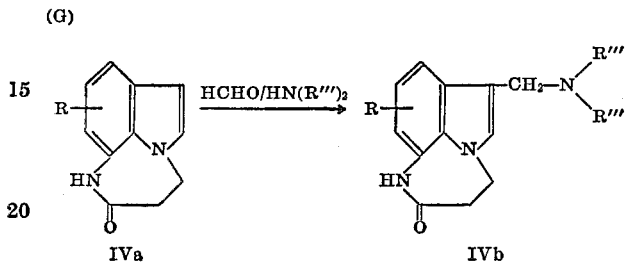

wherein R, R' and R''' are the same as above.

DETAILED DESCRIPTION

Processes A and B are conducted by reacting the 4,5-dihydropyrrolo[3,2,1-jk][1,4]benzodiazepin - 7(6H) - ones (IIIa) and the 4,5-dihydropyrrolo[1,2,3-ef][1,5]benzodiazepin-6(7H)-ones (IV), respectively, with either lithium aluminum hydride or dibornane in the presence of an aprotic solvent such as ether, dioxane, tetrahydrofuran or diglyme at a temperature of 0 to 100° C. and a reaction time of 1 to 18 hours. The product is recovered from the reaction mixture by conventional procedures, such as crystallization, evaporation, chromatography and combinations thereof.

This method is not utilized to prepare compounds of Formula I wherein R' is 4-oxo-4-(p-fluorophenyl)butyl because the carbonyl in the side chain as well as the carbonyl of the lactam moiety could be reduced thereby.

In process C, compounds of Formula I wherein R' is 4-oxo-4-(p-fluorophenyl)butyl are prepared by refluxing compounds having the formula of Ib with 4-chloro-4'-fluorobutyrophenone in an inert solvent for 18 to 48 hours. Solvents that may be utilized include benzene, toluene, xylene, 4-methyl-2-pentanone and the like. Preferably, the reaction is conducted in the presence of a catalyst such as potassium iodide and an acid acceptor such as sodium carbonate. The product is recovered by conventional procedures such as crystallization, evaporation, chromatography or a combination thereof.

In process D, the 4,5-dihydropyrrolo[3,2,1-jk][1,4] benzodiazepin-7(6H)-ones (IIIb) are prepared by dehydrogenating the corresponding 1,2,4,5-tetrahydropyrrolo [3,2,1-jk][1,4]benzodiazepin-7(6H)-ones (V). This dehydrogenation may be performed by either of two procedures.

In the first procedure the dehydrogenation is conducted by reacting the appropriate 1,2,4,5-tetrahydropyrrolo [3,2,1-jk][1,4]benzodiazepin-7(6H)-one (V) with a palladium catalyst in the presence of an inert solvent at a temperature of from 100–200° C. for a period of 1 to 3 hours. Solvents that can be used in this procedure include quinoline, decalin, p-cymene, naphthalene and mesitylene. The product is recovered by conventional procedures such as crystallization, evaporation, chromatography and combinations thereof. This procedure cannot be utilized to prepare compounds of Formula IIIb wherein R is halogen because the procedure removes halogen substituents from the aromatic ring.

6 - [3-(dimethylamino)propyl]-4,5,6,7-tetrahydropyrrolo[3,2,1-jk][1,4]benzodiazepine dihydrochloride.

Example 14.—4,5-dihydro-6-methylpyrrolo[3,2,1-jk][1,4]benzodiazepin-7(6H)-one

A stirred solution of 10.0 g. (0.0538 mole) of 4,5-dihydropyrrolo[3,2,1-jk][1,4]benzodiazepin-7(6H)-one (Example 6) in 500 ml. of dry dimethylformamide is cooled in an ice bath under nitrogen and treated with a 57.1% mineral oil suspension of sodium hydride (2.43 g.). The resulting mixture is warmed on the steam bath for 1 hour, cooled in an ice bath and treated with a solution of 8.38 g. of methyl iodide in 90 ml. of ether. This mixture is kept at ambient temperature for 18 hours and concentrated in vacuo. The residue is suspended in water and extracted with methylene chloride. The extract is dried over anhydrous potassium carbonate and concentrated in vacuo. The residue is chromatographed on 800 g. of silica gel with 50% acetone-50% Skellysolve B hexanes (by volume). The desired crude product is the first material eluted from the column. This product is recrystallized twice from ethyl acetate-Skellysolve B hexanes to yield 4,5-dihydro-6-methylpyrrolo[3,2,1-jk][1,4]benzodiazepin-7(6H)-one, melting point 105.5–106.5° C.

*Analysis.*—Calcd. for $C_{12}H_{12}N_2O$ (percent): C, 71.98; H, 6.04; N, 13.99. Found (percent): C, 71.98; H, 5.70; N, 13.96.

Example 15.—4,5,6,7-tetrahydro-6-methylpyrrolo[3,2,1-jk][1,4]benzodiazepine

A solution of 5.32 g. (0.0266 mole) of 4,5-dihydro-6-methylpyrrolo[3,2,1-jk][1,4]benzodiazepin - 7(6H)-one (Example 14) in 150 ml. of tetrahydrofuran is added, under nitrogen, to a stirred, refluxing suspension of 5.3 g. of lithium aluminum hydride in 200 ml. of tetrahydrofuran. The resulting mixture is refluxed for 18 hours, cooled in an ice bath and treated successively with 5.3 ml. of water, 5.3 ml. of 15% aqueous sodium hydroxide and 15.9 ml. of water. This mixture is stirred for about 1 hour and filtered. The filtrate is concentrated in vacuo. Recrystallization of the residue twice from petroleum ether, at 0° C., gives 4,5,6,7-tetrahydro-6-methylpyrrolo[3,2,1-jk][1,4]benzodiazepine, melting point 42.5–44° C.

*Analysis.*—Calcd. for $C_{12}H_{14}N_2$ (percent): C, 77.38; H, 7.58; N, 15.04. Found (percent): C, 77.06; H, 7.44; N, 14.82.

Example 16.—4'-fluoro-4-(4,5-dihydropyrrolo[3,2,1-jk][1,4]benzodiazepin-6(7H)yl)butyrophenone A mixture of 1.72 g. (0.010 mole) of 4,5,6,7-tetrahydropyrrolo[3,2,1-jk][1,4]benzodiazepine (Example 7), 2.82 g. of 4-chloro-4'-fluorobutyrophenone, 3.22 g. of anhydrous sodium carbonate, 70 mg. of potassium iodide and 130 ml. of 4-methyl-2-pentanone is refluxed under nitrogen for 14 hours, cooled and poured into ice water. The layers are separated and the aqueous layer is extracted with ether. The combined organic layer is dried over anhydrous potassium carbonate and concentrated in vacuo. The residue is chromatographed on 200 g. of silica gel with 70% ethyl acetate—30% cyclohexane (by volume) and 100 ml. fractions are collected. The crude product is eluted in fractions 14–23 and recrystallized twice from ethyl acetate-Skellysolve B hexanes to give 4'-fluoro-4-(4,5 - dihydropyrrolo[3,2,1 - jk][1,4]benzodiazepin-6(7H)-yl)butyrophenone, melting point 90–91° C.

*Analysis.*—Calcd. for $C_{21}H_{21}FN_2O$ (percent): C, 74.97; H, 6.29; F, 5.65; N, 8.33. Found (percent): C, 74.80; H, 6.27; F, 5.59; N, 8.50.

Example 17.—1-(dimethylaminomethyl)-4,5-dihydropyrrolo[3,2,1-jk][1,4]benzodiazepin-7(6H)-one A solution (2.43 ml.) of 25% aqueous dimethylamine is cooled with stirring in an ice bath and treated successively with 5 ml. of acetic acid and 0.893 ml. of 37% aqueous formaldehyde. This solution is allowed to warm to ambient temperature and is treated with 1.86 g. (0.010 mole) of 4,5-dihydropyrrolo[3,2,1-jk][1,4]benzodiazepin-7(6H)-one (Example 6). This mixture is stirred, under nitrogen, for 2 hours and poured into ice water. The resulting solution is made alkaline with dilute aqueous sodium hydroxide and extracted with methylene chloride. The extract is dried over anhydrous potassium carbonate and concentrated in vacuo. The residue is treated with ethyl acetate and a small amount of insoluble material is removed by filtration. The filtrate is concentrated and crystallized to yield 1.43 g. of crude product. This product is recrystallized from ethyl acetate to give 1-(dimethylaminomethyl) - 4,5 - dihydropyrrolo[3,2,1-jk][1,4]benzodiazepin-7(6H)-one, melting point 171–172.5° C.

*Analysis.*—Calcd. for $C_{14}H_{17}N_3O$ (percent): C, 69.11; H, 7.04; N, 17.27. Found (percent): C, 69.22; H, 7.24; N, 17.30.

Example 18.—1-(dimethylaminomethyl)-4,5,6,7-tetrahydropyrrolo[3,2,1-jk][1,4]benzodiazepine and dihydrobromide thereof 1-(dimethylaminomethyl) - 4,5 - dihydropyrrolo[3,2,1-jk][1,4]benzodiazepin-7(6H)-one (9.64 g., 0.0392 mole) (Example 17) is added, under nitrogen, to an ice cold stirred suspension of 9.6 g. of lithium aluminum hydride in 1.2 l. of tetrahydrofuran, and the resulting mixture is refluxed for 7 hours and kept at ambient temperature for 18 hours. It is then cooled in an ice bath and treated successively with 9.6 ml. of water, 9.6 ml. of 15% aqueous sodium hydroxide and 28.8 ml. of water. The solid is collected by filtration, and the filtrate is concentrated in vacuo. The residue is crystallized at 6° C. from ethyl acetate-Skellysolve B hexanes to give 7.38 g. of crude product. Recrystallization of this product from ethyl acetate-Skellysolve B hexanes yields 1-(dimethylaminomethyl)-4,5,6,7-tetrahydropyrrolo[3,2,1-jk][1,4]benzodiazepine, melting point 67.5–68.5° C.

*Analysis.*—Calcd. for $C_{14}H_{19}N_3$ (percent): C, 73.32; H, 8.35; N, 18.33. Found (percent): C, 73.40; H, 8.32; N, 18.22.

A solution of 1-(dimethylaminomethyl)-4,5,6,7-tetrahydropyrrolo[3,2,1-jk][1,4]benzodiazepin in ethyl acetate is acidified with methanolic hydrogen bromide, and the resulting product is recrystallized from methanol-ethyl acetate to yield 1-(dimethylaminomethyl)-4,5,6,7-tetrahydropyrrolo[3,2,1-jk][1,4]benzodiazepine dihydrobromide, melting point 227° C. (dec.).

*Analysis.*—Calcd. for $C_{14}H_{19}N_3 \cdot 2HBr$ (percent): C, 42.98; H, 5.41; Br, 40.86; N, 10.74. Found (percent): C, 42.89; H, 5.28; Br, 40.70; N, 10.58.

Example 19.—9-chloro-1-(dimethylaminomethyl)-4,5-dihydropyrrolo[3,2,1-jk][1,4]benzodiazepin-7(6H)-one Aqueous dimethylamine (25%) (2.43 ml.) is cooled in an ice bath and treated successively with glacial acetic acid (5 ml.) and 27% aqueous formaldehyde (0.89 ml.). This solution is warmed to 18° C. and treated with 2.20 g. (0.010 mole) of 9-chloro-4,5-dihydropyrrolo[3,2,1-jk][1,4]benzodiazepin-7(6H)-one (Example 8). This mixture is stirred at ambient temperature for 2 hours, at 40–50° C. for 1.25 hours and at 80° C. for 45 minutes. It is then poured into ice water and made alkaline with 15% aqueous sodium hydroxide. The initially formed gum crystallizes and is collected by filtration and dried to give 2.36 g. of 9-chloro-1-(dimethylaminomethyl)-4,5-dihydropyrrolo[3,2,1-jk][1,4]benzodiazepin - 7(6H)-one, melting point 228–231° C. (dec.).

Example 20.—9-chloro-1-(dimethylaminomethyl)-4,5,6,7-tetrahydropyrrolo[3,2,1-jk][1,4]benzodiazepine and dihydrochloride thereof To a stirred suspension of 2 g. of lithium aluminum hydride in 500 ml. of tetrahydrofuran is added 2.08 g. of 9-chloro-1-(dimethylaminomethyl) - 4,5 - dihydropyrrolo[3,2,1-jk][1,4]benzodiazepin-7(6H)-one (Example 19), and the resulting mixture is refluxed under nitrogen for 18 hours, cooled and treated successively with 2 ml. of water, 2 ml. of 15% aqueous sodium hydroxide and 6 ml. of water. This mixture is stirred for 1 hour and filtered. The filtrate is concentrated in vacuo to yield 9-chloro - 1 - (dimethylaminomethyl) - 4,5,6,7 - tetrahydropyrrolo[3,2,1-jk][1,4]benzodiazepine as a residue.

9-chloro-1(dimethylaminomethyl) - 4,5,6,7 - tetrahydropyrrolo[3,2,1-jk][1,4]benzodiazepine is dissolved in 95% ethanol and acidified with methanolic hydrogen chloride. The mixture is filtered and the recovered solid is recrystallized from methanol-ethyl acetate to give 9-chloro - 1 - (dimethylaminomethyl) - 4,5,6,7 - tetrahydropyrrolo[3,2,1 - jk][1,4]benzodiazepine dihydrochloride, melting point 243–244.5° C.

*Analysis.*—Calcd. for $C_{14}H_{18}ClN_3 \cdot 2$ HCl (percent): C, 49.96; H, 5.99; Cl, 31.59; N, 12.48. Found (percent): C, 49.91; H, 6.27; Cl, 30.69; N, 12.14.

I claim:
1. A compound selected from the group consisting of
   (a) A compound having the formula

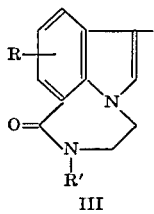 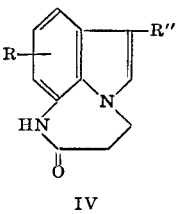

III          IV wherein R is selected from the group consisting of hydrogen, alkyl of from 1 to 3 carbon atoms, inclusive, alkoxy of from 1 to 3 carbon atoms, inclusive, and halogen; wherein R' is selected from the group consisting of hydrogen, alkyl of from 1 to 3 carbon atoms, inclusive, 4-oxo-4-(p-fluorophenyl)butyl, the group

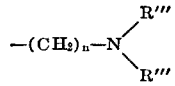

wherein $n$ is an integer of from 2 to 4, inclusive, and R''' is alkyl of from 1 to 3 carbon atoms, inclusive; and wherein R'' is hydrogen or the group

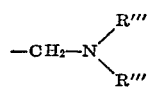

wherein R''' is the same as above; and
(b) the addition salts with pharmacologically acceptable acids of the compound of the above formulae wherein R' is

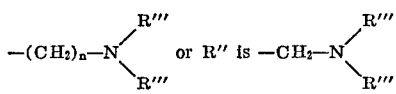

as defined above.

2. A compound of claim 1 having the formula of III.
3. A compound of claim 2 wherein R, R' and R'' are each hydrogen.
4. A compound of claim 2 wherein R and R'' are each hydrogen and R' is 2-(diethylamino)ethyl.
5. The oxalate of the compound of claim 4.
6. A compound of claim 2 wherein R and R'' are each hydrogen and R' is 3-(dimethylamino)propyl.
7. A compound of claim 2 wherein R and R'' are each hydrogen and R' is methyl.
8. A compound of claim 2 wherein R and R' are each hydrogen and R'' is dimethylaminomethyl.
9. A compound of claim 2 wherein R is 9-chloro and R' and R'' are each hydrogen.
10. A compound of claim 2 wherein R is 9-chloro, R' is hydrogen and R'' is dimethylaminomethyl.
11. A compound of claim 1 having the formula of IV.
12. A compound of claim 11 wherein R and R'' are each hydrogen.
13. A compound of claim 11 wherein R is hydrogen and R'' is dimethylaminomethyl.
14. A compound of claim 11 wherein R is 9-chloro and R'' is hydrogen.

No references cited.

HENRY R. JILES, Primary Examiner

R. T. BOND, Assistant Examiner

U.S. Cl. X.R.

252—401; 424—274; 260—326.9, 326.11, 326.5 B dilute aqueous sodium hydroxide and then with water, and then extracted with a hot methanol methylene chloride solution. The extract is concentrated and the residue is crystallized from tetrahydrofuran to give an additional 3.81 g. of crude product. The two crops of product are combined and recrystallized from methanol-methylene chloride to yield 9-chloro-4,5-dihydropyrrolo[3,2,1-jk][1,4]benzodiazepin-7(6H)-one, melting point 231.5–232.5° C.

*Analysis.*—Calcd. for $C_{11}H_9ClN_2O$ (percent): C, 59.87; H, 4.11; Cl, 16.07; N, 12.70. Found (percent): C, 59.68; H, 3.93; Cl, 16.19; N, 12.27.

Example 9.—9-chloro-4,5,6,7-tetrahydropyrrolo[3,2,1-jk][1,4]benzodiazepine

A solution of 3.80 g. (0.0172 mole) of 9-chloro-4,5-dihydropyrrolo[3,2,1-jk][1,4]benzodiazepin - 7(6H) - one (Example 8) in 430 ml. of tetrahydrofuran is added under nitrogen to a stirred refluxing suspension of 3.8 g. of lithium aluminum hydride in 170 ml. of tetrahydrofuran and the resulting mixture is refluxed for 8 hours and allowed to stand at ambient temperature 18 hours. The mixture is then cooled in an ice bath and treated successively with 3.8 ml. of water, 3.8 ml. of 10% aqueous sodium hydroxide and 11.4 ml. of water. The mixture is stirred for about 1 hour and filtered. The filtrate is concentrated under reduced pressure, and the residue is crystallized from ether-Skellysolve B hexanes to give 2.91 g. of crude product. This product is recrystallized from ether-Skellysolve B hexanes to give 9-chloro-4,5,6,7-tetrahydropyrrolo[3,2,1-jk][1,4]benzodiazepine, melting point 70–71.5° C.

*Analysis.*—Calcd. for $C_{11}H_{11}ClN_2$ (percent): C, 63.92; H, 5.37; Cl, 17.16; N, 13.56. Found (percent): C, 63.83; H, 5.36; Cl, 17.17; N, 13.38.

Example 10.—6-[2-(diethylamino)ethyl]-4,5-dihydropyrrolo[3,2,1-jk][1,4]benzodiazepin-7(6H)-one and oxalate thereof A stirred solution of 12.0 g. (0.0645 mole) of 4,5-dihydropyrrolo[3,2,1-jk][1,4]benzodiazepin - 7(6H) - one (Example 6) in 650 ml. of dry dimethylformamide under nitrogen is treated with a 57.1% mineral oil suspension of sodium hydride (2.98 g.) and warmed on the steam bath for 45 minutes. This mixture is cooled in an ice bath, treated with a solution of 10.5 g. of 2-(diethylamino)ethyl chloride in 90 ml. of ether, kept at ambient temperature for 18 hours and concentrated in vacuo. A suspension of the residue in water is extracted with methylene chloride. The extract is dried over anhydrous potassium carbonate and concentrated under reduced pressure. Chromatography of the residue on 1.2 kg. of silica gel with 10% benzene-2% triethylamine-88% methanol (by volume) gives 6-[2-(diethylamino)ethyl]-4,5-dihydropyrrolo[3,2,1 - jk][1,4]benzodiazepin-7(6H)-one. This base is converted to its oxalate salt by treating an ethanol solution of it with one molar equivalent of oxalic acid. The product thus obtained is recrystallized twice from ethanol-ethyl acetate to yield 6-[2-(diethylamino)ethyl]-4,5-dihydropyrrolo[3,2,1 - jk][1,4]benzodiazepin-7(6H)-one oxalate, melting point 168–170° C.

*Analysis.*—Calcd. for $C_{17}H_{23}N_3O \cdot C_2H_2O_4$ (percent): C, 60.78; H, 6.71; N, 11.19. Found (percent): C, 60.83; H, 6.67; N, 11.22.

Example 11. — 6-[2-(diethylamino)ethyl]-4,5,6,7 - tetrahydropyrrolo[3,2,1-jk][1,4]benzodiazepine and dihydrochloride thereof A solution of 11.0 g. (0.0386 mole) of 6-[2-(diethylamino)ethyl] - 4,5-dihydropyrrolo[3,2,1-jk][1,4]benzodiazepin-7(6H)-one (Example 10) in 350 ml. of tetrahydrofuran is added, under nitrogen, to a stirred refluxing suspension of 11 g. of lithium aluminum hydride in 250 ml. of tetrahydrofuran. The resulting mixture is refluxed for 18 hours, cooled in an ice bath and treated successively with 11 ml. of water, 11 ml. of 15% aqueous sodium hydroxide and 33 ml. of water. This mixture is stirred for about 1 hour and filtered. The filtrate is concentrated in vacuo, the residue is dissolved in 95% ethanol, and the solution is acidified with methanolic hydrogen chloride. The resulting salt is crystallized from ethanol-ethyl acetate to give 8.41 g. of crude product. The product is recrystallized from ethanolethyl acetate to give 6-[2-(diethylamino)ethyl] - 4,5,6,7 - tetrahydropyrrolo[3,2,1-jk][1,4]benzodiazepine dihydrochloride, melting point 244.5–246.5° C.

*Analysis.*—Calcd. for $C_{17}H_{25}N_3 \cdot 2HCl$ (percent): C, 59.30; H, 7.91; Cl, 20.59; N, 12.20. Found (percent): C, 59.47; H, 7.83; Cl, 20.69; N, 11.93.

The free base, 6-[2-(diethylamino)ethyl]-4,5,6,7-tetrahydropyrrolo[3,2,1-jk][1,4]benzodiazepine, is prepared by basifying an aqueous solution of the above dihydrochloride with sodium hydroxide, extracting the mixture with ether and evaporating the extract to dryness.

Example 12.—6-[3-(dimethylamino)propyl]-4,5-dihydropyrrolo[3,2,1-jk][1,4]benzodiazepin-7(6H)-one A stirred solution of 12.0 g. (0.0646 mole) of 4,5-dihydropyrrolo[3,2,1-jk][1,4]benzodiazepin-7(6H)-one (Example 6) in 700 ml. of dry dimethyl formamide is treated with a 57.1% suspension of sodium hydride in mineral oil (2.99 g.). The resulting mixture is warmed, under nitrogen, on a steam bath for 1 hour, cooled in an ice bath and treated with a solution containing 8.65 g. of 3-(dimethylamino)propyl chloride and 90 ml. of ether. This mixture is kept at ambient temperature for 18 hours and concentrated in vacuo. The residue is suspended in water and extracted with methylene chloride. The extract is dried over anhydrous potassium carbonate and concentrated. The residue is chromatographed on 1 kg. of silica gel with 2% triethylamine-48% methanol-50% ethyl acetate (by volume) and the desired material thus obtained is crystallized from ethyl acetate-Skellysolve B hexanes to give 10.62 g. of crude product. This product is recrystallized from ethyl acetate to give 6-[3-(dimethylamino)propyl] - 4,5 - dihydropyrrolo[3,2,1-jk][1,4]benzodiazepin-7(6H)-one, melting point 101.5–102.5° C.

*Analysis.*—Calcd. for $C_{16}H_{21}N_3O$ (percent): C, 70.82; H, 7.80; N, 15.49. Found (percent): C, 70.57; H, 7.76; N, 15.91.

Example 13. — 6 - [3 - (dimethylamino)propyl]-4,5,6,7-tetrahydropyrrolo[3,2,1-jk][1,]4benzodiazepine and dihydrochloride thereof A solution of 8.05 g. (0.0295 mole) of 6-[3-(dimethylamino)propyl] - 4,5-dihydropyrrolo[3,2,1-jk][1,4]benzodiazepin-7(6H)-one (Example 12) in 250 ml. of tetrahydrofuran is added under nitrogen to a refluxing suspension of 8.0 g. of lithium aluminum hydride in 200 ml. of tetrahydrofuran, and the resulting mixture is refluxed for 18 hours, cooled in an ice bath and treated successively with 8 ml. of water, 8 ml. of 15% aqueous sodium hydroxide and 24 ml. of water. The mixture is stirred for about 1 hour and filtered. The filtrate is concentrated in vacuo to yield 6-[3-(dimethylamino)propyl]-4,5,6,7-tetrahydropyrrolo[3,2,1-jk][1,4]benzodiazepine.

A solution of this base in methanol is acidified with methanolic hydrogen chloride and the resulting salt is recrystallized twice from methanol-ethyl acetate to give hydrated 6 - [3 - (dimethylamino)propyl]-4,5,6,7-tetrahydropyrrolo[3,2,1-jk][1,4]benzodiazepine dihydrochloride, melting point 244–246° C.

*Analysis.*—Calcd. for $C_{16}H_{23}N_3 \cdot 2HCl$ (percent): C, 58.18; H, 7.63; Cl, 21.47; N, 12.72. Found (percent): C, 55.70; H, 7.70; Cl, 20.79; N, 12.46; $H_2O$, 3.81.

Found after correction for 3.81% $H_2O$ (percent): C, 57.91; H, 7.56; Cl, 21.61; N, 12.95.

The hydrated 6-[3-(dimethylamino)propyl] - 4,5,6,7-tetrahydropyrrolo[3,2,1-jk][1,4]benzodiazepine dihydrochloride is maintained at about 110° C. and about 12 mm. of mercury pressure for 48 hours, to obtain anhydrous Example 2.—4,5,6,7-tetrahydropyrrolo[1,2,3-ef][1,5] benzodiazepine A solution of 11.1 g. (0.0592 mole) of 4,5-dihydropyrrolo[1,2,3 - ef][1,5]benzodiazepin - 6(7H) - one (Example 1) in 900 ml. of tetrahydrofuran is added under nitrogen to a stirred, refluxing suspension of 11 g. of lithium aluminum hydride in 500 ml. of tetrahydrofuran and the resulting mixture is refluxed for 18 hours, cooled in an ice bath and treated successively with 11 ml. of water, 11 ml. of 15% aqueous sodium hydroxide and 33 ml. of water. This mixture is stirred for about 1 hour and filtered. The filtrate is concentrated in vacuo and the residue is crystallized from ethyl acetate-Skellysolve B hexanes to give 7.87 g.of crude product. This product is recrystallized from ethyl acetate-Skellysolve B hexanes to yield 4,5,6,7-tetrahydropyrrolo[1,2,3-ef][1,5]benzodiazepine, melting point 79.5–80.5° C.

*Analysis.*—Calcd. for $C_{11}H_{12}N_2$ (percent): C, 76.71; H, 7.02; N, 16.27. Found (percent): C, 76.82; H, 7.13; N, 16.21.

Example 3.—9-chloro-4,5-dihydropyrrolo[1,2,3-ef] [1,5]benzodiazepin-6(7H)-one

A stirred mixture of 38.9 g. (0.175 mole) of 9-chloro-1,2,4,5 - tetrahydropyrrolo[1,2,3-ef][1,5]benzodiazepine-6(7H)-one, 48 g. (0.211 mole) of 2,3-dichloro-5,6-dicyano-1,4-benzoquinone and 780 ml. of benzene is refluxed under nitrogen for 7 hours and allowed to stand at ambient temperature for 18 hours. The solid is collected by filtration, washed with benzene, and stirred for 1.5 hours with a mixture of dilute aqueous sodium hydroxide (1.5 l.) and methylene chloride (1.5 l.). The resulting solid is collected by filtration and washed with dilute aqueous sodium hydroxide. The aqueous filtrate is extracted with methylene chloride, and the solid is extracted several times with boiling methylene chloride. The combined methylene chloride extracts are washed with a saturated solution of sodium chloride, dried over anhydrous potassium carbonates and concentrated in vacuo. The residue is crystallized from methylene chloride-methanol (decolorizing charcoal treatment) to give 20.5 g. of crude product. The product is recrystallized from methylene chloride-methanol to give 9-chloro-4,5-dihydropyrrolo[1,2,3 - ef][1,5]benzodiazepin - 6(7H) - one, melting point 234–235° C.

*Analysis.*—Calcd. for $C_{11}H_9ClN_2O$ (percent): C, 59.87; H, 4.11; Cl, 16.07; N, 12.70. Found (percent): C, 59.85; H, 4.26; Cl, 16.24; N, 12.86.

Example 4.—9-chloro-4,5,6,7-tetrahydropyrrolo[1,2,3-ef] [1,5]benzodiazepine

A solution of 8.0 g. (0.0364 mole) of 9-chloro-4,5-dihydropyrrolo[1,2,3-ef][1,5]benzodiazepin - 6(7H) - one (Example 3) in 600 ml. of tetrahydrofuran is added under nitrogen to a stirred, refluxing suspension of 8.0 g. of lithium aluminum hydride in 400 ml. of tetrahydrofuran, and the resulting mixture is refluxed for 8 hours and allowed to stand at ambient temperature for 18 hours. This mixture is cooled in an ice bath and treated successively with 8 ml. of water, 8 ml. of 15% aqueous sodium hydroxide and 24 ml. of water. The resulting mixture is stirred for 1 hour and filtered. The filtrate is concentrated in vacuo, and the residue is crystallized from ethyl acetate-Skellysolve B hexanes to give 6.3 g. of crude product. The product is recrystallized from ethyl acetate-Skellysolve B hexanes to give 9-chloro-4,5,6,7-tetrahydropyrrolo[1,2,3-ef][1,5]benzodiazepine, melting point 128.5–129.5° C.

*Analysis.*—Calcd. for $C_{11}H_{11}ClN_2$ (percent): C, 63.92; H, 5.37; Cl, 17.16; N, 13.56. Found (percent): C, 64.20; H, 5.37; Cl, 17.17; N, 13.55.

Example 5.—1-(dimethylaminomethyl)-4,5-dihydropyrrolo[1,2,3-ef][1,5]benzodiazepin-6(7H)-one A solution of 25% aqueous dimethylamine (2.43 ml.) is cooled with stirring in an ice bath and treated successively with 5.0 ml. of acetic acid and 0.893 ml. of 37% aqueous formaldehyde. This solution is allowed to warm to ambient temperature and is treated with 1.86 g. (0.010 mole) of 4,5-dihydropyrrolo[1,2,3-ef][1,5]benzodiazepin-6(7H)-one (Example 1). This mixture is stirred, under nitrogen, for 3 hours and poured into ice water. The cold solution is made alkaline with sodium hydroxide and the precipitate is collected by filtration, washed with water and dried to give 2.17 g. of crude product. Recrystallization of this product twice from methanol-ethyl acetate yields 1 - (dimethylaminomethyl) - 4,5-dihydropyrrolo-[1,2,3-ef][1,5]benzodiazepin-6(7H)-one, melting point 193–193.5° C.

*Analysis.*—Calcd. for $C_{14}H_{17}N_3O$ (percent): C, 69.11; H, 7.04; N, 17.27. Found (percent): C, 68.90; H, 6.92; N, 17.06.

Example 6.—4,5-dihydropyrrolo[3,2,1-jk][1,4]benzodiazepin-7(6H)-one

A stirred mixture of 23.8 g. (0.127 mole) of 1,2,4,5-tetrahydropyrrolo[3,2,1 - jk][1,4]benzodiazepin - 7(6H)-one, 380 ml. of decalin and 11.5 g. of 10% palladium-on-carbon catalyst is refluxed under nitrogen for 1.5 hours. The mixture is cooled in an ice bath, diluted with 450 ml. of Skellysolve B hexanes and allowed to crystallize. The solid is collected by filtration, washed with Skellylsolve B hexanes and extracted with methanol. The methanol extract is concentrated under reduced pressure, and the residue is crystallized from ethanol-ethyl acetate to give 16.19 g. of crude product. This crude product is recrystallized from methanol-ethyl acetate to yield 4,5-dihydropyrrolo[3,2,1-jk][1,4]benzodiazepin - 7(6H) - one, melting point 173–174° C.

*Analysis.*—Calcd. for $C_{11}H_{10}N_2O$ (percent): C, 70.95; H, 5.41; N, 15.05. Found (percent): C, 71.34; H, 5.41; N, 15.01.

Example 7.—4,5,6,7-tetrahydropyrrolo[3,2,1-jk][1,4] benzodiazepine

A solution of 11.2 g. (0.0604 mole) of 4,5-dihydropyrrolo[3,2,1-jk][1,4]benzodiazepin-7(6H)-one (Example 6) in 900 ml. of dry tetrahydrofuran is added under nitrogen to a stirred, refluxing suspension of 11.5 g. of lithium aluminum hydride in 500 ml. of tetrahydrofuran. The resulting mixture is refluxed for 18 hours, cooled in an ice bath and treated successively with 11.5 ml. of water, 11.5 ml. of 15% aqueous sodium hydroxide and 34.5 ml. of water. The solid is collected by filtration and the filtrate is concentrated under reduced pressure. Crystallization of the residue from ethyl acetate-Skellysolve B hexanes gives 5.32 g. of crude product. Recrystallization of this crude product from ethyl acetate-Skellysolve B hexanes yields 4,5,6,7-tetrahydropyrrolo[3,2,1 - jk][1,4]benzodiazepine, melting point 62.5–63.5° C.

*Analysis.*—Calcd. for $C_{11}H_{12}N_2$ (percent): C, 76.71; H, 7.02; N, 16.27. Found (percent): C, 76.83; H, 7.05; N, 16.12.

Example 8.—9-chloro-4,5-dihydropyrrolo[3,2,1-jk][1,4] benzodiazepin-7(6H)-one

A stirred mixture of 10.0 g. (0.0450 mole) of 9-chloro-1,2,4,5-tetrahydropyrrolo[3,2,1-jk][1,4]benzodiazepin - 7 (6H)-one, 12.3 g. (0.0542 mole) of 2,3-dichloro-5,6-dicyano-1,4-benzoquinone and 200 ml. of dry benzene is refluxed under nitrogen for 7 hours, cooled and filtered. The resulting solid is suspended in a mixture of about 400 ml. of cold dilute aqueous sodium hydroxide and about 400 ml. of methylene chloride, stirred for 30 minutes and mixture is filtered. The methylene chloride solution is washed with a saturated solution of sodium chloride, dried over anhydrous potassium carbonate and concentrated. Crystallization of the residue from tetrahydrofuran (decolorizing charcoal treatment) gives 2.20 g. of crude product. The stricky solid obtained from the above filtration is mixed with diatomaceous earth, washed several times with cold,

TABLE I

| Compound | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Test: | | | | | | | | | | | | | | | | | |
| Chimney | 45 | 10 | >50 | >100 | >100 | 11 | 36 | 40 | 25 | >100 | >50 | >50 | 36 | 20 | 16 | 45 | 63 |
| Dish | 10 | 12 | >50 | >100 | 45 | 7.1 | >50 | 40 | 9 | >89 | 50 | 25 | 36 | 20 | 32 | 35 | 20 |
| Pedestal | 9 | 28 | >50 | 63 | >100 | 14 | 32 | >50 | 23 | 100 | >50 | >50 | 40 | 25 | 32 | 89 | 29 |
| N.A.: | | | | | | | | | | | | | | | | | |
| TE | 15 | 11 | 12 | 18 | 45 | 12.5 | 36 | >50 | 15 | 20 | >50 | 40 | 45 | >25 | 15 | 200 | 63 |
| D | 25 | 11 | 12 | 18 | 45 | 12.5 | 36 | >50 | 15 | 20 | >50 | 40 | 45 | >25 | 16 | 159 | 63 |

Note.—N.A.=Nicotine Antagonism; TE=Tonic Extensor Fits; D=Death.

TABLE II

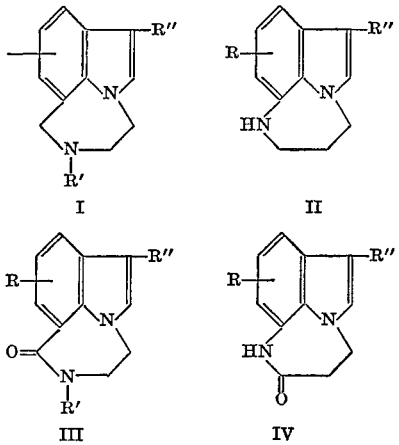

| Compound | Formula | R | R' | R'' |
|---|---|---|---|---|
| 1 | I | H | H | H |
| 2 | I | 9-Cl | H | H |
| 3 | I | H | —(CH$_2$)$_2$N(C$_2$H$_5$)$_2$ | H |
| 4 | I | H | —(CH$_2$)$_3$N(CH$_3$)$_2$ | H |
| 5 | I | H | CH$_3$ | H |
| 6 | I | H | —(CH$_2$)$_3$—C(=O)—C$_6$H$_4$—F | H |
| 7 | I | H | H | —CH$_2$N(CH$_3$)$_2$ |
| 8 | I | 9-Cl | H | —CH$_2$N(CH$_3$)$_2$ |
| 9 | II | H | | H |
| 10 | II | 9-Cl | | H |
| 11 | III | H | H | H |
| 12 | III | H | —(CH$_2$)$_2$N(C$_2$H$_5$)$_2$ | H |
| 13 | III | H | —(CH$_2$)$_3$N(CH$_3$)$_2$ | H |
| 14 | III | H | CH$_3$ | H |
| 15 | III | H | H | —CH$_2$N(CH$_3$)$_2$ |
| 16 | IV | H | | H |
| 17 | IV | H | | —CH$_2$N(CH$_3$)$_2$ |

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets powder packets capsules and the like solid dosage forms, using starch and like excipients, or dissolved in suitable solvents or vehicles for oral or parenterel administration.

Also, for mammals and birds food premixes, with starch, oatmeal, dried fishmeat, fishmeal flour and the like can be prepared.

The novel compounds of this invention having the formulae (a) I and II and (b) III and IV wherein R' is

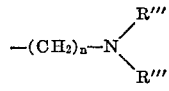

or R'' is

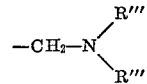

as defined above also form thiocyanic acid addition salts which when condensed with formaldehyde, form resinous materials useful as pickling inhibitors according to U.S. Pat. 2,425,320 and U.S. Pat. 2,606,155. The fluosilicic acid addition salts of said compounds are useful as mothproofing agents according to U.S. Pats. 1,915,334 and 2,075,359.

The following examples are set forth to illustrate my invention and to enable persons skilled in the art to better understand and practice the invention and are not intended to limit the same.

Example 1.—4,5-dihydropyrrolo[1,2,3-ef][1,5]benzodiazepin-6(7H)-one

A mixture of 17,5 g. (0.0930 mole) of 1,2,4,5-tetrahydropyrrolo[1,2,3-ef][1,5]benzodiazepin-6(7H)-one, 280 ml. of decalin and 8.4 g. of 10% palladium-on-carbon catalyst is refluxed under nitrogen for 1.5 hours, cooled and diluted with 1000 ml. of Skellysolve B hexanes. This mixture is kept in an ice bath for 2 hours and then filtered. The solid is washed with Skellysolve B hexanes and extracted with hot methanol. The methanol extract is concentrated, and the residue is crystallized from methanol-ethyl acetate to give 14.1 g. of crude product. This product is recrystallized from ethyl acetate to yield 4,5-dihydropyrrolo[1,2,3-ef][1,5]benzodiazepin-6(7H)-one, melting point 210–214° C.

*Analysis.*—Calcd. for C$_{11}$H$_{10}$N$_2$O (percent): C, 70.95; H, 5.41; N, 15.05. Found (percent): C, 71.06; H, 5.41; N, 14.71.

In the second dehydrogenation procedure, the 1,2,4,5-tetrahydropyrrolo[3,2,1-jk][1,4]benzodiazepin - 7(6H)-one is refluxed with either chloroanil or 2,3-dichloro-5,6-dicyano-1,4-benzoquinone in the presence of an inert solvent for 2 to 18 hours. Solvents that can be used in this procedure include benzene, toluene, xylene and the like. The product is recovered by conventional procedures such as crystallization, evaporation, chromatography and combinations thereof.

Compounds of Formula IIIc are prepared in accordance with steps 2 and 3 of process D. In step 2, compounds of Formula IIIb are reacted with an alkali metal hydride in the presence of an inert solvent at a temperature of 75–125° C. for 0.5 to 2 hours to prepare the alkali metal salt of IIIb. Solvents that can be utilized include benzene, tetrahydrofuran, dioxane, diglyme, dimethylformamide and dimethyl sulfoxide. In step 3, the reaction mixture containing said alkali metal salt is reacted with an alkyl halide, 4-chloro-4′-fluorobutyrophenone, or tert. aminoalkyl halide having the formula $R_2'$ wherein X is halogen and $R_2'$ is the same as above to produce IIIc. The product is recovered by conventional procedures such as crystallization, evaporation, chromatography and the like.

Process E, which is utilized to prepare 4,5-dihydropyrrolo[1,2,3-ef][1,5]benzodiazepin-6(7H)-ones (IVa) is conducted in the same manner and under the same conditions as step 1 of process D.

The 4,5 - dihydropyrrolo[3,2,1-jk][1,4]benzodiazepin-7(6H)-ones (IIIe) and the 4,5-dihydropyrrolo[1,2,3-ef][1,5]benzodiazepin-6(7H)-ones (IVb) are prepared by processes F and G, respectively. In process F the starting material is a compound of Formula IIId, prepared in process D, and in process G the starting material is a compound of Formula IVa, prepared in process F. In these processes, the starting compounds are reacted with a mixture of 25% aqueous dialkylamine (having the formula

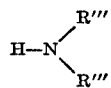

wherein R′′′ is the same as above), 37% aqueous formaldehyde and glacial acetic acid at a temperature of 25–50° C. for 1 to 18 hours. The product is recovered from the reaction mixture by conventional procedures such as crystallization, evaporation, chromatography and combinations thereof.

The 1,2,4,5 - tetrahydropyrrolo[3,2,1-jk][1,4]benzodiazepin-7(6H)-ones (V) and the 1,2,4,5-tetrahydropyrrolo[1,2,3-ef][1,5]benzodiazepin-6(7H)-ones (VI) employed as starting materials in the above processes D and E can be prepared by the process illustrated by the following equations in which R is the same as above.

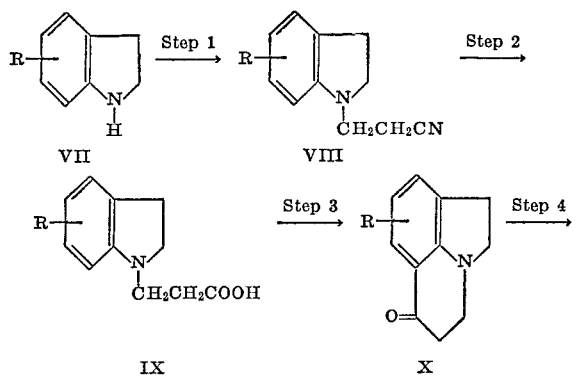

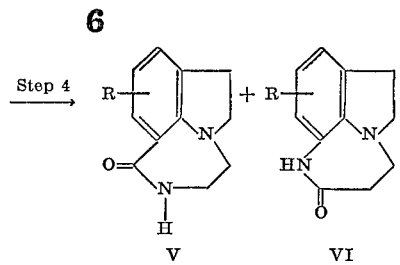

Step 1 involves reacting the appropriate indoline (VII) with acrylonitrile to form a 1-indolinepropionitrile (VIII). In step 2, the 2-indolinepropionitrile is converted to the corresponding 1-indolinepropionic acid (IX). Step 3 involves heating the 1-indolinepropionic acid with polyphosphoric acid to form a 1,2,4,5-tetrahydro-6H-pyrrolo[3,2,1-ij]quinolin-6-one (X). The conditions utilized in these three steps are described in considerable detail in Rapoport et al., J. Org. Chem., 23, 248 (1958).

In step 4, the 1,2,4,5 - tetrahydro-6H-pyrrolo[3,2,1-ij]-quinolin-6-one (X) is reacted with sodium azide in the presence of polyphosphoric acid to form a mixture of a 1,2,4,5 - tetrahydropyrrolo[3,2,1-jk]['1,4]benzodiazepin-7 (6H)-one (V) and a 1,2,4,5 - tetrahydropyrrolo[1,2,ef] [1,5]benzodiazepin - 6(7H)-one (VI). These compounds are readily separated by conventional procedures such as crystallization, evaporation, chromatography and combinations thereof. The preferred temperature at which this reaction is conducted is 50 to 60° C.; however, higher or lower temperatures may be utilized if desired. The molar ratio of ketone to sodium azide should be 1 to 1.3 and the reaction time is from 1 to 5 hours.

The acid addition salts of the invention comprise the salts of the compounds of Formulae I, II, III and IV as noted above, with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids, and the like.

The novel compounds of this invention exhibit tranquilizing and anticonvulsant activity. This activity was evaluated by use of the following tests.

CHIMNEY TEST [MED. EXP. 4, 11 (1961)]

This test determines the ability of mice to back up and out of a vertical glass cylinder within 30 seconds. Failure of mice to back up and out within this time indicates tranquilization.

DISH TEST

Mice in petri dishes (10 cm. diameter, 5 cm. high and partially imbedded in wood shavings) climb out in a very short time, when not treated. Mice remaining in the dish for more than 3 minutes indicates tranquilization.

PEDESTAL TEST

Mouse is placed on a pedestal. The untreated mouse leaves the pedestal in less than a minute to climb back to the floor of the standard mouse box. Tranquilized mice will stay more than 1 minute.

NICOTINE ANTAGONISM TEST

Thirty minutes after mice in a group are treated with the test compound, both the treated and untreated mice are injected with 2 mg./kg. of nicotine salicylate. The untreated mice show overstimulation, i.e., (1) running convulsion followed by (2) tonic extensor fits, followed by (3) death. An effective nicotine antagonist will protect the treated mice against (2) and (3).

The results of the above tests utilizing some of the novel compounds of this invention (administered intraperitoneally) are set forth in Table I. The results are expressed in terms of the mg./kg. dosages at which the tested compounds exhibited activity in 50% of the mice ($ED_{50}$). The structures of the various compounds are set forth in Table II.

UNITED STATES PATENT OFFICE
CERTIFICATE OF CORRECTION

Patent No. 3,734,919    Dated May 22, 1973

Inventor(s) Jackson B. Hester, Jr.

It is certified that error appears in the above-identified patent and that said Letters Patent are hereby corrected as shown below:

Column 2, line 15, "Formulae II and IV" should read -- formulae III and IV --. Column 4, line 35, "dibornane" should read -- diborane --. Column 5, lines 2-3, "benzodiazepin-7(6H-one" should read -- benzodiazepin-7(6H)-one --; line 20, "formula $R_2'$ wherein" should read -- formula $R_2'X$ wherein --; line 34, "prepared in process F." should read -- prepared in process E. --. Column 6, line 13, "In step 2, the 2-indolinepropionitrile" should read -- In step 2, the 1-indolinepropionitrile --; lines 24-25, "-tetrahydropyrrolo[1,2ef][1,5]" should read -- -tetrahydropyrrolo[1,2,3-ef][1,5] --. Column 7, Table II, formula I, " 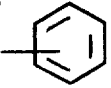 " should read -- 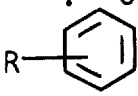 --; line 54, "and like exciplents," should read -- and like excipients, --; line 57, "parenterel administration." should read -- parenteral administration. --; line 59, "fishmeal flour and" should read -- fishmeal, flour and --. Column 10, line 29, "crystallized from ethanol-ethyl acetate" should read -- crystallized from methanol-ethyl acetate --; line 74, "stricky solid" should read -- sticky solid --. Column 12, line 47, [3,2,1-jk][1,]4benzodiazepine" should read -- [3,2,1-jk][1,4]benzodiazepine --. Column 15, line 17, "C. 49.96;" should read -- C, 49.94; --.

Signed and Sealed this thirtieth Day of August 1977

[SEAL]

Attest:

RUTH C. MASON
Attesting Officer

C. MARSHALL DANN
Commissioner of Patents and Trademarks